June 14, 1938.  F. M. REID  2,120,509

LOCKING DEVICE FOR SEMITRAILERS

Filed May 14, 1937  2 Sheets-Sheet 1

INVENTOR
Frederick M. Reid.
BY
Harness, Dickey & Pierce.
ATTORNEYS.

June 14, 1938.   F. M. REID   2,120,509
LOCKING DEVICE FOR SEMITRAILERS
Filed May 14, 1937   2 Sheets-Sheet 2
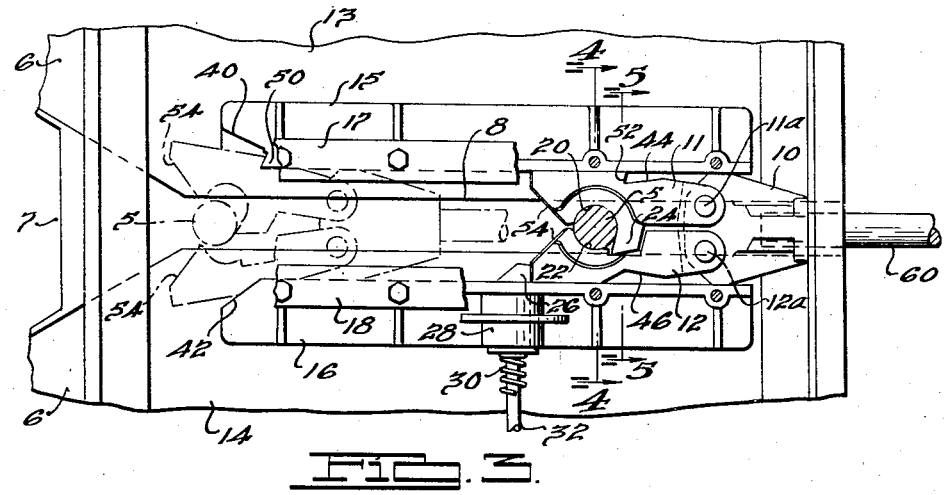
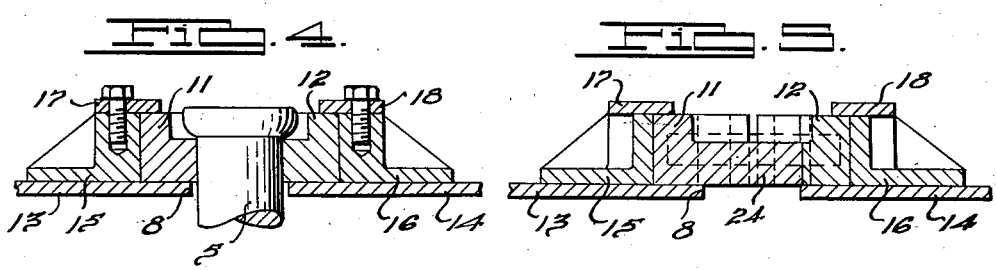
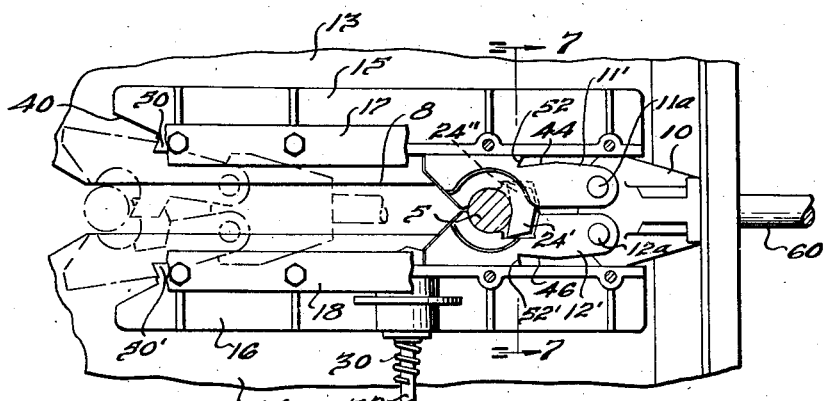
INVENTOR
Frederick M. Reid.
BY
Harness, Dickey & Pierce,
ATTORNEYS.

Patented June 14, 1938

2,120,509

UNITED STATES PATENT OFFICE 2,120,509

LOCKING DEVICE FOR SEMITRAILERS

Frederick M. Reid, Detroit, Mich., assignor to Fruehauf Trailer Company, Detroit, Mich., a corporation of Michigan Application May 14, 1937, Serial No. 142,659

4 Claims. (Cl. 280—33.1)

This invention relates to semi-trailers and has to do more particularly with a locking device for locking a semi-trailer to a tractor vehicle for drawing the same.

Semi-trailers are constructed with wheels for permanently supporting the rear end, and the forward end when in active use is supported by a vehicle, such as a tractor. For this purpose the semi-trailer is usually provided with an upper fifth wheel construction, and the tractor with a lower fifth wheel construction. The tractor is detachable from a semi-trailer and the semi-trailer is conventionally provided with a support for holding up the front end of the semi-trailer when detached from the tractor, this support being moved out of the way when the tractor and semi-trailer are connected and automatically moved into supporting position when the tractor and semi-trailer are disconnected. A representative apparatus of this type is disclosed and claimed in my United States Letters Patent No. 1,838,868, issued December 29, 1931 on Locking device for semi-trailers.

Apparatus of the type above described in which supporting means for the front end of the semi-trailer are brought into operative position with respect to the ground when the tractor is disconnected from the trailer is usually provided with a latching device for holding the supporting means in operative position. This means usually includes a ratchet type of device co-operating directly with the supporting device, and additional means for maintaining the king-pin locking jaws in their distended and projected condition in which they are placed as the king-pin on the tractor is finally withdrawn from between them. This last mentioned means is not shown in my prior patent above identified, but an equivalent means is shown and described in United States Patent No. 1,806,191 to A. B. Cadman, issued May 19, 1931 on Trailer vehicle. This last mentioned means has conventionally taken the form of a spring pressed device automatically projected between the distended jaws of the king-pin lock when the king-pin is withdrawn from between the jaws. There is one drawback to the conventional type of construction as above described in that it sometimes occurs that if the tractor is withdrawn too quickly from the semi-trailer the supporting legs for the front end of the semi-trailer are moved so quickly toward their operative position that they strike an abutment at the extreme end of their movement and sometimes rebound without becoming latched at that point, and at the same time the spring pressed member adapted to maintain the king-pin jaws in distended position may not act with sufficient rapidity with the result that the rebound of the supporting legs effects a reverse movement of the king-pin locking jaws before the member intended to maintain them in spread condition has an opportunity to drop into place, the result being in such case that the supporting legs fold up and permit the front end of the semi-trailer to drop to the ground.

Accordingly, it is an object of the present invention to provide a king-pin locking mechanism for a semi-trailer which is positive in action; to provide a structure of the type described that is simple in construction and economical to manufacture; to provide a construction of the type described in which once the king-pin locking jaws are spread to their distended position by withdrawal from the king-pin therefrom any force transmitted thereto from the supporting legs will act to more strongly hold the jaws in distended position; and the provision of a construction of the type described which because of its positive action will eliminate the possibility of the supporting legs for the front end of the semi-trailer from moving out of their normally latched supporting relation when once moved thereinto upon withdrawal of the tractor from the trailer.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Figure 1 is a fragmentary plan view of the front portion of a semi-trailer showing the king-pin locking mechanism and the supporting structure for the front end of the semi-trailer;

Fig. 3 is an enlarged fragmentary plan view of the king-pin locking mechanism shown in the preceding views;

Fig. 4 is a slightly enlarged vertical transverse sectional view taken on the line 4—4 of Fig. 3;

Fig. 5 is a slightly enlarged vertical transverse sectional view taken on the line 5—5 of Fig. 3;

Fig. 6 is a view similar to Fig. 3 but illustrating a modified form of construction; and Fig. 7 is a slightly enlarged vertical transverse sectional view taken on the line 7—7 of Fig. 6.

Figure 1:
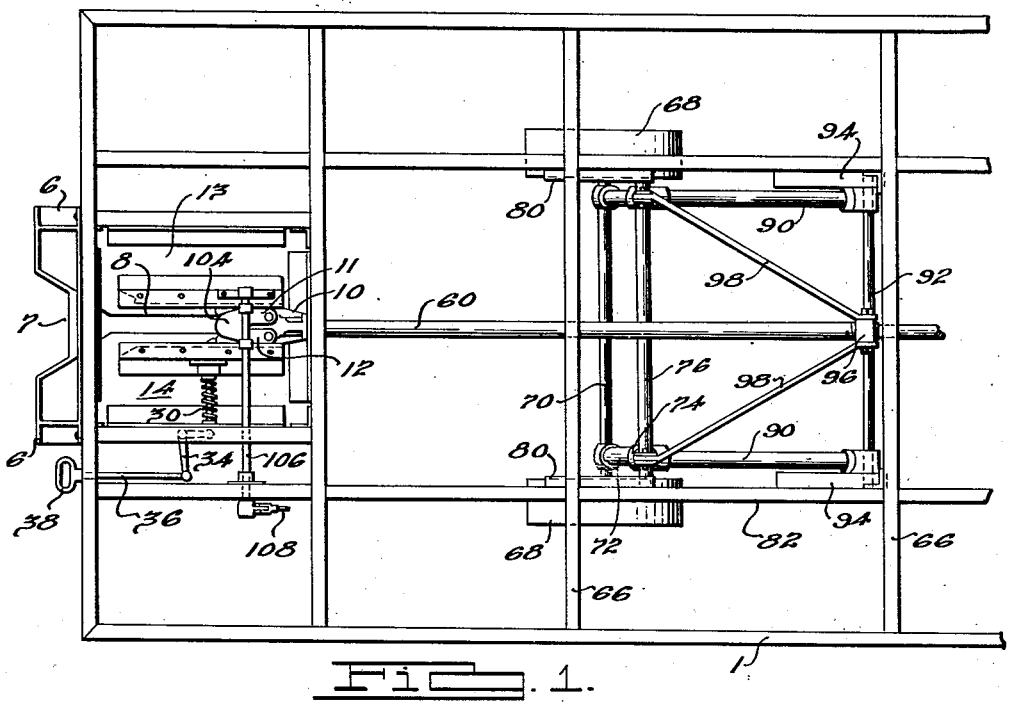
Figure 2:
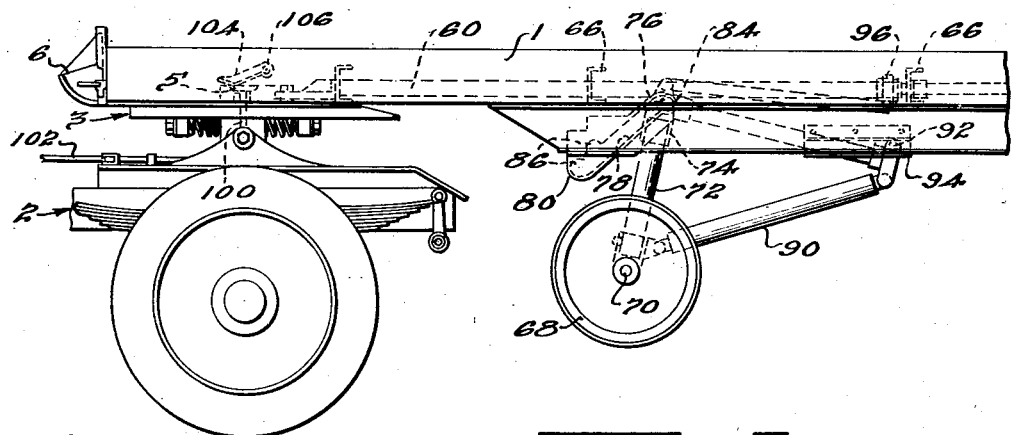
Fig. 2 is a side elevational view of a portion of a semi-trailer equivalent to that shown in Fig. 1 shown attached to a portion of a tractor.

Referring to the drawings and particularly to Figs. 1 and 2, the trailer includes a frame or platform 1, the rear end of which is supported by wheels (not shown). The forward end of the trailer frame is supported by a tractor 2 through a fifth wheel construction 3. The fifth wheel of the tractor carries a king-pin 5 which is adapted to be engaged by the locking device carried by the semi-trailer frame. The front end of the frame is provided with a bumper-like member 6 provided with a flared open passageway 7 which leads into a slot 8 extending centrally into the fifth wheel construction 3. These bumper-like members ride over the lower fifth wheel construction of the tractor when it is backed into the semi-trailer, acting to raise the front end of the semi-trailer, and the king-pin 5 is guided by the side walls of the passageway 7 into the slot 8.

The locking device includes a head 10 reciprocable longitudinally of the semi-trailer and which carries a pair of locking jaws or members 11 and 12 each pivotally secured thereto for movement about a vertically extending axis by means of pins 11a and 12a, respectively, located on opposite sides of the longitudinal center-line of the head 10. This reciprocating head 10 and the two locking members or jaws 11 and 12 reciprocate in unison in an under-cut slideway. This slideway is provided by plates 13 and 14 fixed to the trailer frame and upon which are bolted or riveted brackets 15 and 16. It may be noted that the plates 13 and 14 co-operate to form the slot 8. Secured to the top of the brackets are plates 17 and 18 thus forming a pair of under-cut slideways (see Figs. 4 and 5).

The outer end portions of the jaws 11 and 12 are each provided in their opposed edges with a partially circular recess 20 and 22, respectively, which combine when the jaws are in their contracted position as indicated in full lines in Fig. 3 to form an approximately circular opening for receiving the king-pin 5 therein. Also as noted in Fig. 3 the jaw member 11 is provided with a lug portion 24 projecting across the longitudinal centerline of the slideway in which the jaws are received, at the rear side of the recess 20, and the jaw 12 is cut-away to provide clearance for such lug when the jaws are in closed position. As will be apparent when the king-pin 5 is received between the two jaws 11 and 12 and the two jaws are positioned rearwardly of the front end of the slideway which, therefore, positively prevents them from spreading, the king-pin 5 is positively locked with respect to the jaws 11 and 12 and the head 10.

In order to lock the jaws 11 and 12 against relative movement with respect to the guideway in which they are reciprocable and thereby enable the tractor and the semi-trailer to be positively locked together against relative longitudinal movement, a transversely reciprocable latch member 26 is suitably mounted in a boss 28 formed on the side of the bracket 16 and is constantly urged toward projected position by means of a coil spring 30. The latch member 26 is automatically projected over the forward end of the jaw member 12 when the jaw member 12 together with the jaw member 11 and head 10 are moved to the extremity of their position in a rearward direction, as illustrated in Fig. 3. The latch member 26 may be withdrawn in any suitable manner when it is desired to uncouple the tractor from the semi-trailer, the particular means shown comprising a rod 32 connected to the latch member 26 and, as indicated in Fig. 1, connected at its opposite end to a bell crank 34 suitably mounted upon the frame 1 of the semi-trailer. The opposite end of the bell crank 34 is connected by a rod 36 to a handle 38 conveniently positioned for manual operation.

When it is desired to uncouple the tractor from the semi-trailer, the latch member 26 is withdrawn by means of the handle 38 and the tractor is moved forwardly, the king-pin 5 being fixed thereto and moving forwardly with it causing the jaw members 11 and 12 and the slidable head 10 to move forwardly with the king-pin. During this forward movement of the king-pin 5, as soon as the jaw members 11 and 12 are projected beyond the forward end of the slideway formed by the brackets 15 and 16 and co-operating members to such an extent that the slideway no longer confines the jaw members 11 and 12 against spreading action, the king-pin 5 acting upon the forward edges of the recesses 20 and 22 of the jaw members will tend to spread the jaw members to a sufficient extent to permit the king-pin 5 to be withdrawn therefrom as indicated in dotted lines in Fig. 3. In order to permit this spreading action of the jaw members 11 and 12 and also to limit the amount which the jaw members may spread to that only slightly in excess necessary to permit withdrawal of the king-pin 5, the forward ends of the brackets 15 and 16 are outwardly flared as at 40 and 42, respectively, and the outer side faces of the jaw members 11 and 12 are cut-away as at 44 and 46, respectively, to permit such spreading without necessitating full projection of the jaws 11 and 12 from the slideway. Although spring means may be employed between the two jaw members 11 and 12 to aid them in their spreading movement in a manner substantially equivalent to that shown in my prior patent above referred to, such means are not at all necessary in accordance with the present invention and may be dispensed with entirely if desired with the construction shown.

In accordance with the present invention, instead of employing spring pressed means adapted to be projected between the jaw members 11 and 12 when in projected position as illustrated in the Cadman Patent No. 1,806,191 above referred to and as employed in most conventional constructions, the forward end of the bracket member 15 adjacent the inner end of the beveled face 40 is provided with an inwardly and forwardly directed tooth 50 and the cut-away portion 44 of the jaw member 11 is provided with a forward end wall 52 adapted to engage over the forward face of the tooth member 50 in hooked relation thereto when the jaws 11 and 12 are withdrawn from their slideway to permit them to be spread sufficiently to permit withdrawal of the king-pin 5 from therebetween. Because of the hook-like relation between the forward face of the tooth 50 and the wall 52, once these parts are brought into engagement by withdrawal of the king-pin 5 from between the jaws, not only is rearward movement of the jaws 11 and 12 and their sliding head 10 prevented by forces acting through the head 10, but inward movement of the jaw 11 is also prevented. In the particular construction shown in Figs. 1 to 5, inclusive, no particular attempt is made to prevent the jaw member 12 from moving inwardly when in projected position as such movement of the jaw member 12 would have no appreciable effect upon the operativeness of the construction inasmuch as the extreme forward ends of the jaw members 11 and 12 are inwardly beveled as at 54 so that the king-pin 5, when moving rearwardly into engaging relation with respect to the jaw members 11 and 12, will force them apart in any event to permit introduction between them if the jaw members are in projected position permitting their separation.

When the jaw members 11 and 12 are in the projected position indicated in dotted lines in Fig. 3 and the tractor is backed into the semi-trailer, the king-pin 5 will be engaged by the divergent side walls of the slot 7 and be guided into the narrow portion 8 thereof where in its rearward movement it will strike the projecting end of the lug 24 on the jaw member 11 at a point, with the relation to its direction of travel, on the opposite side of the pivot pin 11a from the wall 52, and thus positively turn the jaw member 11 in a counter-clockwise direction as viewed in Fig. 3 and forcibly disengage the wall 52 from the tooth 50, thereby permitting the jaw member 11 to move inwardly towards the king-pin to a position which will permit it to slide rearwardly in the slideway. The jaw member 12, simply through inter-engagement of the forward end of its cut-away portion 46 with the beveled forward end 42 of the bracket 16 will in being drawn rearwardly, be pulled into its operative position and the two jaw members 11 and 12 operatively embrace opposite sides of the king-pin 5. Further rearward movement of the king-pin 5 will thereupon cause both jaw members 11 and 12 and the reciprocable member 10 to move rearwardly in their slideway until they reach the position indicated in full lines in Fig. 3 at which time the latch member 26, which has been depressed by the jaw member 12 in passing thereover, be projected into blocking relation with respect to the member 12, thereby positively locking the tractor and semi-trailer together in driving relation.

As indicated in Figs. 1 and 2 the slideable head 10 is connected to the forward end of the longitudinally extending rod member 60 provided with suitable bearings in one or more of the cross-members 66. The raisable and lowerable front legs for the semi-trailer include a pair of wheels 68 carried at the ends of an axle member 70. The axle member 70 inwardly of each of the wheels 68 is provided with an upwardly projecting leg 72, the upper ends of which are each provided with a bracket member 74. The bracket members 74 are connected together by a rod or tube 76 the opposite ends of which project outwardly beyond the corresponding brackets 74 and are slidably received within the downwardly and forwardly extending slots 78 formed on the inner face of the corresponding member 80 fixed to the inner face of the longitudinally extending rails 82 of the semi-tractor frame. The upper end of each slot 78 is turned rearwardly and downwardly a slight amount as indicated at 84 in Fig. 2 so that when the wheels 68 are in their raised position the ends of the cross-bar 76 will remain seated in the portions 84 under the force of gravity.

The lower end of the slots 78 are each provided with a pair of adjacent upwardly projecting pocket portions or recesses 86 which when the wheels are in their lowered position bring the opposite projecting ends of the cross-bar 76 thereinto when the front end of the semi-trailer is dropped a slight amount, so as to hold the wheels in their fully projected position. The wheels 68 are braced in their lower position by means of a pair of rod members 90 the forward ends of which are fixed to the lower ends of the legs 72 and the rearward and upper ends of which are connected together by means of a cross-rod 92. The opposite ends of the cross-rod 92 project beyond the rod members 90 and are slidably received in horizontal guideways 94 fixed to the inner side of the rails 82.

In order to raise and lower the wheels 68 through longitudinal reciprocatory movement of the rod 60 a bracket 96 is fixed to the rod 60 and a pair of link members 98 connected at one end thereto extend forwardly therefrom and are pivotally connected at their forward ends to the respective brackets 74. Accordingly, it will be understood that when the rod 60 is moved forwardly from the position indicated in Figs. 1 and 2 in order to uncouple the semi-trailer from the tractor, the upper end of the legs 72 will be moved forwardly and downwardly in the slots 78, thus causing the wheels to be lowered and moving the projecting ends of the cross-rods 78 into a position to be engaged in the pockets 86 when the front end of the trailer is lowered as it is released from the rear end of the tractor. When the tractor backs into the trailer in order to connect it thereto, the initial movement of the engagement will effect a lifting movement of the front end of the semi-trailer, thus dropping the projecting ends of the cross-bar 78 out of the corresponding pockets 86 and thence rearward movement of the rod 60 will cause the wheels 68 to be elevated with the rest of their supporting mechansm.

As previously mentioned, one difficulty experienced with conventional types of constructions of which my prior patent above identified may be taken as an example is that, if the tractor was withdrawn from the semi-trailer too quickly, the projecting ends of the cross-bars 78 would be forced downwardly in the corresponding slots 78 with such speed that they would hit the bottom of the slots 78 and rebound upwardly in the slots before such projecting end had an opportunity to be engaged in the pockets 86, and at the same time the means employed in conventional constructions for dropping in between the distended king-pin jaws, because of the quick rebound movement of the rod 60 corresponding to the rebound of the wheels or other supporting legs, would fail to function, with the result that as the tractor pulled out from under the front end of the semi-trailer the supporting legs would simply fold up into their normally inoperative position and permit the front end of the semi-trailer to drop to the ground, causing great inconvenience in returning it to its proper position and often causing damage to the semi-trailer and also to the goods which it might then be carrying. This difficulty in connection with the prior structures is effectively prevented by the employment of the present invention inasmuch as soon as the wheels 68 are moved to their fully projected position the jaw members 11 and 12 are positively spread or distended and the wall 52 is positively moved over the outer face of the tooth 50, so that any tendency of the wheels 68 to rebound and thus cause a rearward movement of the rod 60 will be positively prevented by the interlocking relation of the wall 52 and tooth 50, and the greater the force which tends to retract the rod 60 the greater will be the locking force exerted between the walls 52 and tooth 50 to resist such movement. Consequently any rebounding tendency of the wheels 68 tending to move the projecting ends of the cross-rods 76 out of a position to engage in the pockets 86 is positively and effectively prevented and, accordingly, inadvertent collapse of the supporting legs is positively and simply prevented. Additionally, it will be noted that this positive effect is obtained by use of fewer number of parts than in conventional constructions inasmuch as the means employed in conventional constructions for spring pressed projection between the distended jaws of the king-pin lock is eliminated.

The trailer may also include mechanism for operating brakes on its wheels and this mechanism may operate through the fifth wheel construction. For this purpose the king-pin 5 may be provided with an axially extending plunger 100, as indicated in Fig. 2, extending therethrough and which is operable by means of a rod such as 102 which leads to the driver's seat. The plunger 100 in moving upwardly actuates a member 104 secured to a rock shaft 106 and which is in turn connected to the wheel brakes of the semi-trailer by means of a rod 108 in a conventional manner.

In Figs. 6 and 7 a slight modification of the present invention is shown but inasmuch as all parts thereof with the exception of the jaw members themselves and the front end of the bracket member 16 is identical to the construction previously described, all parts except the jaw members are indicated by the same numerals as in the previous views, the jaw members in this case being indicated by the numerals employed in the previous views except that such numerals bear a prime mark. The only difference between the construction shown in Figs. 6 and 7 and that shown in the previous views is that both jaw members 11' and 12' are provided for hook-like engagement with the outer ends of the corresponding brackets 15 and 16 when the jaw members are in their distended or open position. In other words, in this case the jaw member 12' is provided with a wall 52' corresponding with the wall 52 of the jaw members 11 and 11' and the outer end of the bracket 16 is provided with a tooth member 50', corresponding to the tooth 50 previously described, for co-operating with the jaw member 12' in identically the same manner. In this case inasmuch as both jaw members are provided for locking or hooked engagement with the ends of the respective brackets it is necessary that the lug 24' on the jaw 11' be reduced to half its thickness and an equivalent lug 24" be provided on the jaw member 12', the lugs 24' and 24" being arranged to lie in overlapping relationship with respect to each other to permit proper functioning of the jaw members. The obvious effect of this construction is to positively lock the jaw members 11' and 12' in their open positions when once caused to open under the influence of the withdrawal of the king-pin 5.

Formal changes may be made in the specific embodiment of the invention described without departing from the spirit or substance of the broad invention, the scope of which is commensurate with the appended claims.

What I claim is:

1. In a tractor-trailer fifth wheel device, in combination, means forming a slideway therebetween, a member movable longitudinally of said slideway, a pair of jaw members pivotally connected to said movable member and provided with recesses in their opposed faces adapted for reception and retention of a king-pin therein, said jaw members being separable when in partially projected position with respect to said slideway whereby to release said king-pin therefrom, and inter-engaging means on said slideway and one of said jaw members when said jaw member is in opened position forming sole means to positively lock said movable member against movement inwardly of said slideway under the influence of forces applied thereto independently of said jaw members.

2. In a tractor-trailer fifth wheel structure, in combination, means forming a slideway, a member movable longitudinally of said slideway, a pair of jaws pivotally connected to said member for sliding movement in said slideway and positively maintained against separation when fully confined therein, said jaws having matching recesses in opposed edges thereof for reception and retention of a king-pin and being movable outwardly relatively to one another about their pivotal axes when in partially projected position with respect to said slideway whereby to release a king-pin engaged therebetween, and inter-engageable means on one of said jaws and on said means forming a hook-like connection therebetween when said jaw is in opened position whereby to positively prevent retractive movement of said jaws in said slideways when said jaws are in opened position, under the influence of forces acting on said member independently of said jaws tending to withdraw said jaw members into said slideway.

3. In a semi-trailer structure, in combination, a frame, supporting means for one end of said frame movably associated therewith, means for raising and lowering said supporting means including a longitudinally reciprocable member and a connection between it and said supporting means, a head secured to said longitudinally reciprocable member for reciprocation therewith, means forming a guideway in associated relation with respect to said head, a pair of jaws movably associated with said head and slidably received in said guideway, said jaws being prevented from separation with respect to each other when fully confined in said guideway and having matching recesses formed in opposed faces thereof for reception and retention of the king-pin, said jaws being separable with respect to each other when in partially projected relation with respect to an end of said guideway whereby to release a king-pin confined between them, and inter-engageable means carried by at least one of said jaw members and said guideway forming means inter-engageable when said jaws are in opened position forming sole means to positively prevent withdrawal of said jaws into said guideway under the influence of forces applied thereto through said supporting means.

4. In combination with a semi-trailer, supporting means movably associated with one end of said trailer and movable between supporting and non-supporting positions, means for moving said supporting means between supporting and non-supporting positions including a longitudinally reciprocable member and a connection between it and said supporting means, means forming a slideway, a head on said longitudinally reciprocable member reciprocable therewith along said slideway, a pair of jaws pivotally mounted on said head and slidably received in said slideway, said jaws and slideway being so constructed and arranged that said jaws are positively prevented from separating movement with respect to each other when fully confined in said slideway and said jaws being separable with respect to each other when projected from one end of said slideway, said jaws having co-operating recesses formed in opposed faces thereof for reception and retention of a king-pin when said jaws are in closed position, and means on said slideway forming means and at least one of said jaws inter-engageable when said jaws are in opened position forming a sole means to positively prevent retracting movement of said jaws in said slideway under the influence of forces transmitted thereto from said supporting means.

FREDERICK M. REID.